United States Patent [19]

Trapp

[11] 3,750,774

[45] Aug. 7, 1973

[54] SNOWMOBILE BOGIE WHEEL ASSEMBLY
[75] Inventor: Robert Lee Trapp, Horicon, Wis.
[73] Assignee: Deere & Company, Moline, Ill.
[22] Filed: Nov. 11, 1971
[21] Appl. No.: 197,720

[52] U.S. Cl................ 180/5 R, 305/27, 280/124 B
[51] Int. Cl.......................................... B62d 55/16
[58] Field of Search................... 305/27; 301/63 DD

[56] References Cited
UNITED STATES PATENTS

| 2,659,596 | 11/1953 | Keysor | 305/27 |
|---|---|---|---|
| 3,023,824 | 3/1962 | Bombardier | 305/27 |
| 3,309,150 | 3/1967 | Marier | 301/63 DD |
| 3,386,778 | 6/1968 | Rymes | 305/27 |
| 3,463,561 | 8/1969 | Lamb | 305/27 |
| 3,527,506 | 9/1970 | Erickson | 305/27 |
| 3,548,961 | 12/1970 | Newman | 305/27 |
| 3,630,581 | 12/1971 | Gostomski | 305/27 |
| 3,658,392 | 4/1972 | Perreault | 305/27 |
| 3,684,043 | 8/1972 | Hirsch | 305/27 |

Primary Examiner—Richard J. Johnson
Assistant Examiner—Reinhard Eisenzopf
Attorney—H. Vincent Harsha, William A. Murray et al.

[57] ABSTRACT

A snowmobile has a fore-and-aft channel-like main frame with footrests extending outwardly from the opposite sides of the main frame and an endless track mounted within and connected to the main frame by a plurality of bogie wheel assemblies, the wheels of which engage the inner surface of the lower ground-engaging run of the track. Each bogie wheel assembly includes a transverse shaft having its opposite ends attached to the underside of the opposite footrest by bracket means, which include a pair of members bolted to the underside of the footrest, one of the members having a transverse bore journaling the shaft and an abutment for limiting the axial shifting of the shaft, while the other member includes a U-shaped recess which receives the shaft and clamps it to the first member. A sleeve is rotatably mounted on each shaft and includes a pair of trailing arms respectively journaling axially transverse bogie wheels, the wheels being biased downwardly against the track by a pair of torsion springs around the sleeve.

4 Claims, 4 Drawing Figures

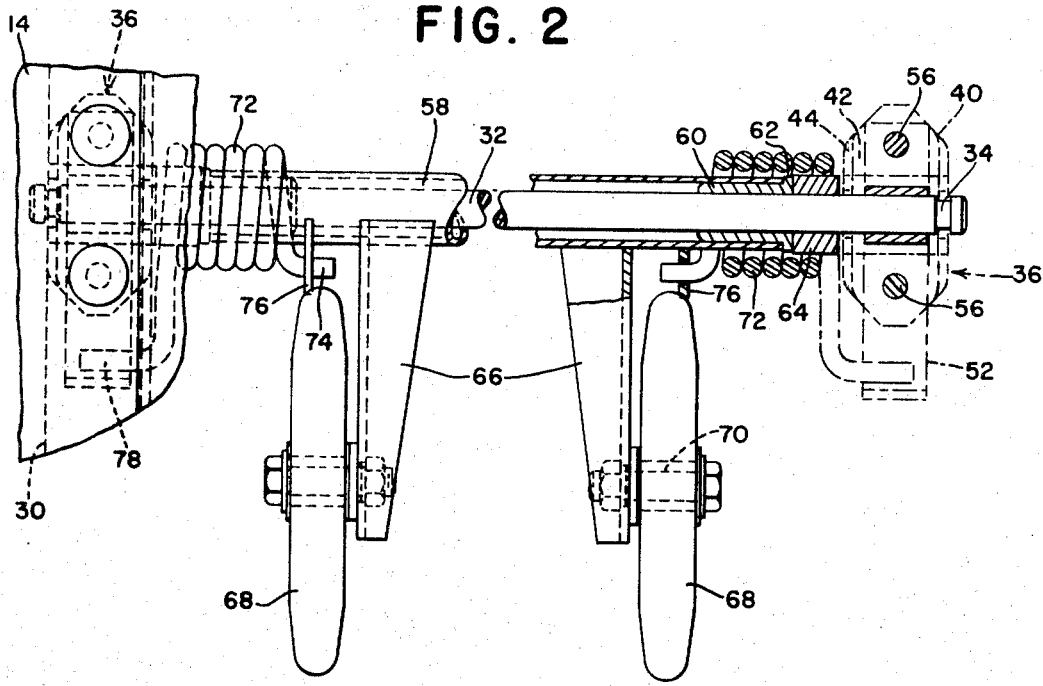
FIG. 2
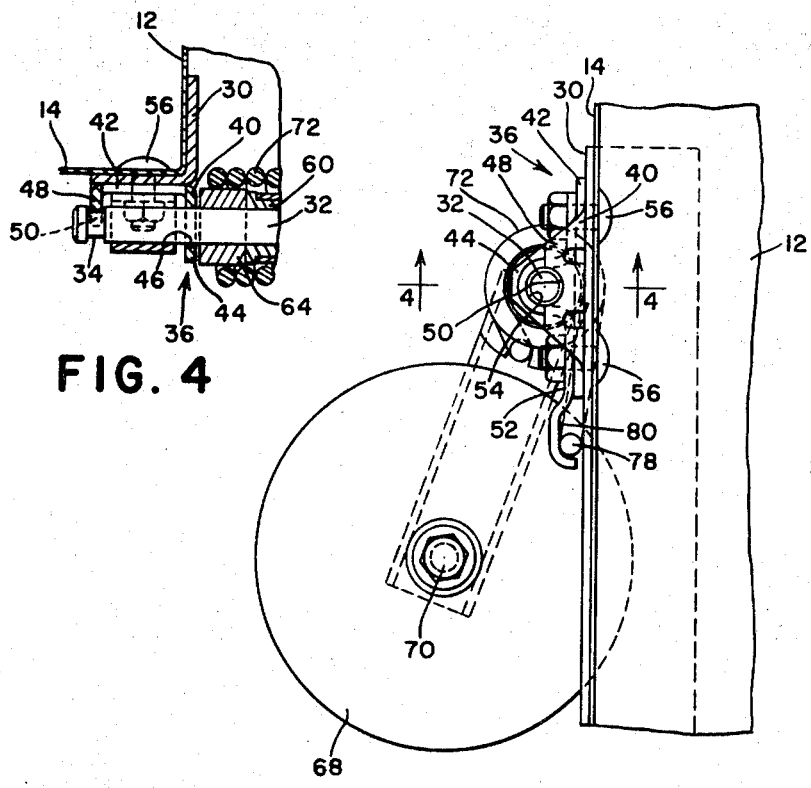
FIG. 4
FIG. 3

SNOWMOBILE BOGIE WHEEL ASSEMBLY

BACKGROUND OF THE INVENTION

This invention relates to snowmobiles and more particularly to an improved bogie wheel assembly in the track suspension system of a snowmobile.

A good share of today's snowmobiles utilize a bogie wheel type track suspension, which includes a plurality of bogie wheel assemblies spaced in a fore-and-aft direction and engageable with the lower run of the track. Typically, the bogie wheels in each assembly are mounted on arms extending radially from one or more sleeves journaled on a transverse shaft spanning the channel-like main frame between the upper and lower runs of the track, the bogie wheels being biased downwardly against the lower run of the track by torsion springs. Generally, footrests are provided at the opposite sides of the main snowmobile frame, and the mounting shafts are below the level of the footrests. Heretofore, the shafts have been connected to the main frame by bolting the shaft to an extension of the vertical side walls of the main frame below the footrests, so that either the footrest or the side wall extensions had to be welded or otherwise attached to the main frame. It is also known, however, to clamp the shaft to the underside of the footrest utilizing U-bolts.

In many cases, the bogie wheels are mounted on both trailing and forwardly extending arms, and the torsion springs have their opposite ends respectively connected to the trailing and forwardly extending arms to bias both arms downwardly. However, when only trailing arms are utilized to give a smoother ride, it is necessary to attach one end of the torsion springs to the main frame.

SUMMARY OF THE INVENTION

According to the present invention, improved means are provided for mounting the bogie wheel assembly shaft on the main frame of the snowmobile, and also connecting torsion spring means in the assembly to the main frame.

An important feature of the invention resides in the use of bracket means at the opposite ends of each shaft for removably connecting the shaft to the underside of the snowmobile footrest. Another feature of the invention resides in the provision of an abutment with each bracket means for preventing the lateral shifting of the shaft.

Still another feature of the invention resides in the utilization of the same bracket means for connecting the shaft to the main frame that is used to connect the torsion spring to the main frame.

BRIEF DESCRIPTION OF THE DRAWINGS

FIG. 2 is a top plan view of a bogie wheel assembly embodying the invention, only a small portion of the main frame being shown and the right-hand portion of the bogie wheel assembly being shown partly in section, the means for mounting the right end of the shaft and the torsion spring to the frame being shown in phantom.

FIG. 3 is a side elevation view of one of the bogie wheel assemblies.

FIG. 4 is a section view of the means for mounting the shaft to the main frame as viewed generally along the line 4—4 of FIG. 3.

DESCRIPTION OF THE PREFERRED EMBODIMENT

Figure 1:
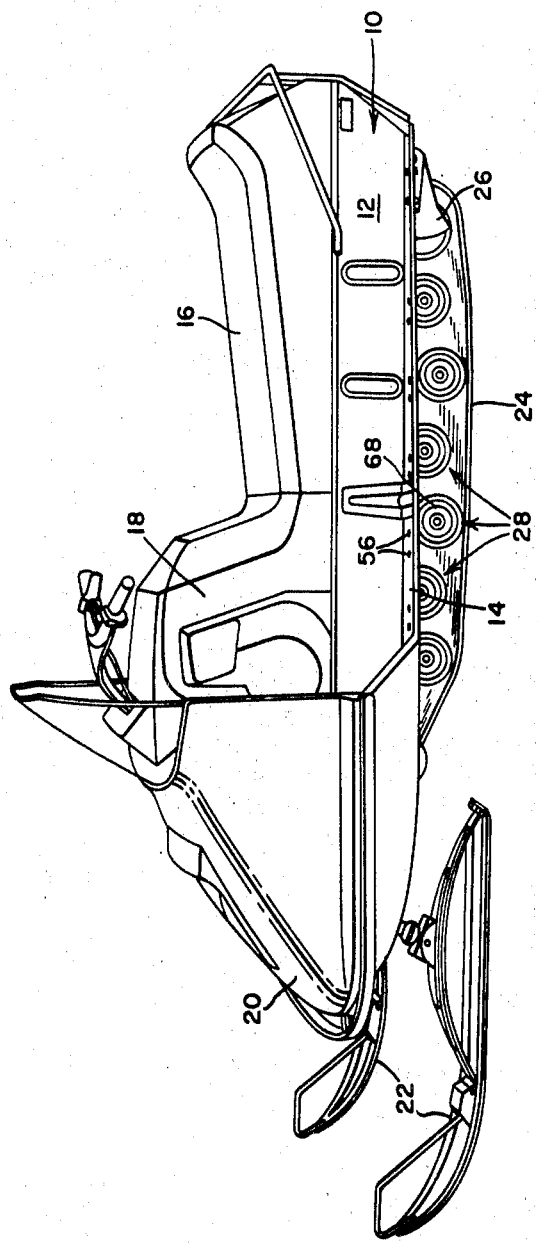
FIG. 1 is a side perspective view of a snowmobile embodying the invention.

The invention is embodied in a snowmobile having a fore-and-aft, channel-shaped main frame 10, of generally inverted U-shaped cross section, such main frames being conventional on snowmobiles and also being referred to as the tunnel. The main frame has vertically extending side walls 12 with generally horizontal footrests 14 extending outwardly from the lower ends of the side walls 12, only the left side wall 12 and footrest 14 being shown in the drawing, since the right side is a mirror image of the left.

As is conventional, a seat 16 is mounted on top of the rearward portion of the main frame to the rear of an engine enclosure 18, which houses an internal combustion engine (not shown), the forward portion of the engine enclosure being formed by a hood 20. The front end of the machine is supported on a pair of steerable skis 22, while the rear end is supported on an endless flexible drive track 24, only the lower ground-engaging run of which is shown in FIG. 1, the upper run being disposed within the channel-like main frame 10 between the side walls 12. The forward end of the drive track is trained around a drive pulley (not shown) in a conventional manner, and the drive pulley in turn is driven by the engine through a transmission. A rear idler assembly 26 is attached to the rear end of the main frame and includes a plurality of pulleys about which the rear end of the track is trained, the rear idler assembly maintaining the necessary track tension.

The main frame is supported on the track by a bogie wheel track suspension system, which includes six bogie wheel assemblies 28. As is apparent, the bogie wheel assemblies are spaced in a fore-and-aft direction, and each assembly is essentially the same, although alternate assemblies have two or three wheels which are staggered relative to wheels in the adjacent assembly. Each bogie wheel assembly spans the main frame between the upper and lower track runs and has its opposite ends connected to the underside of the footrests 14, which are reinforced in the area of the bogie wheels by L-shaped reinforcing members 30, the horizontal leg of each member 30 underlying the footrest while the vertical leg is attached to the inner surface of the main frame side walls 12.

The bogie wheel assembly includes a transverse shaft 32, which extends across the channel-like main frame 10 between the upper and lower track runs and has annular grooves 34 adjacent its opposite ends, which are attached to the underside of the opposite footrest 14 by a pair of bracket means, indicated generally by the numeral 36. Since the bracket means 36 are identical, only a single bracket means will be described herein. The bracket means includes a first bracket member 40 having a horizontal portion 42 seating against the horizontal portion of the reinforcing member 30, a vertical, depending generally triangular inner leg portion 44, lying in a generally vertical fore-and-aft plane and having a transverse bore 46, which journals the shaft 32 inwardly of the shaft groove 34, and a depending outer leg portion 48 parallel and similar to the inner leg portion 44, except that it is truncated and has a semicircular recess 50 in axial alignment with the bore 46.

As is apparent, the reduced diameter portion of the shaft 32 at the groove 34 is received in the semicircular recess 50, so that the outer leg portion forms an abutment which engages the side walls of the groove 34 to limit the axial shifting of the shaft 32.

The bracket means 36 includes a second horizontal fore-and-aft extending bracket member 52, which seats against the underside of the horizontal portion of the first bracket member 40 between the inner and outer legs 44 and 46. The second bracket member 52 has a transversely extending U-shaped recess 54 aligned with the bore 46 and the semi-circular recess 50, so that the shaft is received in the recess 54. The brackets are clamped together to the underside of the reinforcing member 30 by a pair of removable fasteners 56, shown as a pair of bolts extending downwardly through aligned bores in the footrests, the reinforcing member, the first bracket member 40, and the second bracket member 52, and having nuts engaging the underside of the second bracket member 52. A tubular sleeve 58 is journaled on the shaft 32 between the opposite bracket means 36 by a pair of bearings 60 at the opposite ends of the sleeve 58. Each bearing 60 includes a shoulder 62, which engages the end of the sleeve 58 and a pair of spacers 64 are interposed between the opposite bearings 60 and the respective bracket means 36.

A pair of rearwardly and downwardly extending arms 66 are rigidly attached to and extend radially from the sleeve 58, and a pair or bogie wheels 68 are respectively journaled on the rearward ends of the arms 66 by means of transversely extending pivots 70. A pair of coil-type torsion springs 72 coaxially surround the opposite ends of the sleeve 58, the inner end 74 of each torsion spring 72 extending in an axial direction and being attached to a relatively short spring arm 76 rigidly secured to the sleeve 58. The outer ends 78 of the torsion springs extend parallel to the inner ends, but are radially offset to a greater degree, the outer ends being received in transversely extending recesses 80 at the rearward ends of the second bracket members 52. As is apparent, the torque exerted by the spring biases the outer end of the spring in a counterclockwise direction, as seen in FIG. 3, against the underside of the footrest 14, the second bracket member serving as a clamp to retain the outer end of the spring against the footrest, while the opposite or inner end of the torsion spring 72 is biased in a clockwise direction, which tends to rotate the bogie wheel arm 66 in a clockwise direction, biasing the bogie wheel downwardly against the inner surface of the lower run of the track 24. Thus, the force exerted by the torsion springs counterbalances the weight of the machine, and the springs will give to permit upward movement of the bogie wheels when the track encounters a bump, thereby providing a relatively smooth ride.

As is apparent, each bogie wheel assembly 28 can be easily removed for repair by simply undoing the fasteners 56. As is also apparent, the bracket means serves the dual function of retaining the outer ends of the torsion springs and mounting the shaft 32.

I claim:

1. In a snowmobile having a fore-and-aft extending channel-shaped main frame with vertical side walls and laterally extending footrest portions extending outwardly from the lower edges of the side walls and an endless flexible drive track having a lower ground-engaging run and an upper return run within the channel-shaped main frame, the combination therewith of an improved bogie wheel assembly in the track suspension system comprising: a pair of bracket means respectively removably attached to the underside of the opposite footrest portions of the main frame and respectively including transversely aligned bores; a transverse shaft having its opposite ends journaled in the aligned bores and spanning the channel portion of the main frame between the upper and lower track runs, each bracket means including abutment means engageable with the shaft to limit the axial shifting thereof; a sleeve means around said shaft; a plurality of arm members rigidly attached to and extending radially from the sleeve means; a bogie wheel journaled on each arm member axially parallel to the shaft and engageable with the inner surface of the lower run of the track; and a pair of helically wound torsion springs coaxially mounted on the sleeve means and having their inner ends connected thereto, the outer ends of the torsion springs being respectively clamped to the undersides of the opposite footrests by the bracket means for biasing the wheels downwardly against the track and yieldable to permit downward movement of the main frame relative to the track.

2. The invention defined in claim 1 and including a pair of bearings coaxially journaling the opposite ends of the sleeve means on the shaft and a pair of spacers respectively mounted on a shaft between the outer ends of the bearing means and the respective bracket means.

3. The invention defined in claim 1 wherein each bracket means includes a first bracket member having a horizontal portion and a vertical fore-and-aft extending portion provided with said bore and a second bracket member having a horizontal portion and a U-shaped, transversely extending recess, and removable fastener means for removably securing the horizontal portions of the bracket members to the underside of the footrest in a stacked relationship, the shaft being received in the U-shaped recess of the second bracket member and in the bore in the first bracket member.

4. The invention defined in claim 3 wherein the shaft includes an annular groove adjacent its opposite ends and the abutment means is formed by a vertical, fore-and-aft extending projection depending from the horizontal portion of the first bracket member and engageable with one of the grooves to limit the axial shifting of the shaft.

* * * * *